US010370818B2

(12) United States Patent
Bremner

(10) Patent No.: US 10,370,818 B2
(45) Date of Patent: Aug. 6, 2019

(54) GRAPPLE TIP

(71) Applicant: Ryan Arnold Bremner, Lake Country (CA)

(72) Inventor: Ryan Arnold Bremner, Lake Country (CA)

( * ) Notice: Subject to any disclaimer, the term of this patent is extended or adjusted under 35 U.S.C. 154(b) by 39 days.

(21) Appl. No.: 15/352,502

(22) Filed: Nov. 15, 2016

(65) Prior Publication Data

US 2018/0135275 A1 May 17, 2018

(51) Int. Cl.
| | |
|---|---|
| *E02F 3/40* | (2006.01) |
| *A01G 23/06* | (2006.01) |
| *E02F 3/78* | (2006.01) |
| *E02F 3/96* | (2006.01) |
| *E02F 9/28* | (2006.01) |
| *A01G 23/00* | (2006.01) |
| *E02F 3/36* | (2006.01) |

(52) U.S. Cl.
CPC .............. *E02F 3/404* (2013.01); *A01G 23/06* (2013.01); *E02F 3/783* (2013.01); *E02F 3/961* (2013.01); *E02F 9/2816* (2013.01); *A01G 23/003* (2013.01); *E02F 3/3681* (2013.01); *E02F 9/2891* (2013.01)

(58) Field of Classification Search
CPC . E02F 3/783; E02F 9/28; E02F 9/2808; E02F 9/2875; E02F 9/2883; E02F 9/961; E02F 3/404; E02F 3/413; E02F 3/4135; A01G 23/003; A01G 23/06; B66C 3/04
See application file for complete search history.

(56) References Cited

U.S. PATENT DOCUMENTS

| | | | | |
|---|---|---|---|---|
| 1,916,354 | A * | 7/1933 | Barber .................. | E02F 9/2808 37/455 |
| 2,452,452 | A * | 10/1948 | Girnus ..................... | B66C 3/04 294/112 |
| 3,203,488 | A * | 8/1965 | Eastwood, III ........... | E02F 5/32 172/713 |
| 3,384,409 | A * | 5/1968 | Guinot ..................... | B66C 3/04 294/106 |
| 4,536,037 | A * | 8/1985 | Rink ....................... | E02F 3/783 299/109 |
| D306,599 | S * | 3/1990 | Hunter ........................ | D15/32 |
| 5,553,408 | A * | 9/1996 | Townsend ............... | E02F 3/404 37/406 |
| 5,632,527 | A * | 5/1997 | Halder ................... | B25D 17/02 299/100 |
| 5,813,822 | A * | 9/1998 | Pisco ................... | E02F 3/3622 294/104 |

(Continued)

*Primary Examiner* — Jessica H Lutz
(74) *Attorney, Agent, or Firm* — Integrity Patent Group, PLC; Charles E. Runyan

(57) ABSTRACT

A grapple tip includes an outer volume having a working end with a rounded surface. The grapple tip may further include a mounting end, a right side, a left side, a bottom surface, and a top surface. The top surface features a grooved recess that may help the device pick up, hold on to, and transport heavy items such as lumber or construction implements across significant distances. In addition, the grapple tip may also have a raised projection extending from the mounting end to ensure a secure and correct mounting on a damaged grapple assembly claw. The grapple tip is useful for upgrading or replacing existing tips that may have become damaged or worn.

18 Claims, 5 Drawing Sheets

(56) References Cited

U.S. PATENT DOCUMENTS

| | | | | |
|---|---|---|---|---|
| 5,926,958 | A * | 7/1999 | Ramun | B23D 17/00 |
| | | | | 30/134 |
| 6,854,201 | B1 * | 2/2005 | Hunter | E02F 9/2808 |
| | | | | 299/34.01 |
| 9,185,855 | B2 | 11/2015 | Humphrey | |
| 2003/0012597 | A1 * | 1/2003 | Miller | E02F 3/404 |
| | | | | 403/322.2 |
| 2005/0235498 | A1 * | 10/2005 | Cossette | B23D 31/008 |
| | | | | 30/134 |
| 2008/0282585 | A1 * | 11/2008 | Cox | E02F 3/404 |
| | | | | 37/406 |
| 2015/0013197 | A1 * | 1/2015 | Campomanes | E02F 9/2833 |
| | | | | 37/453 |

\* cited by examiner

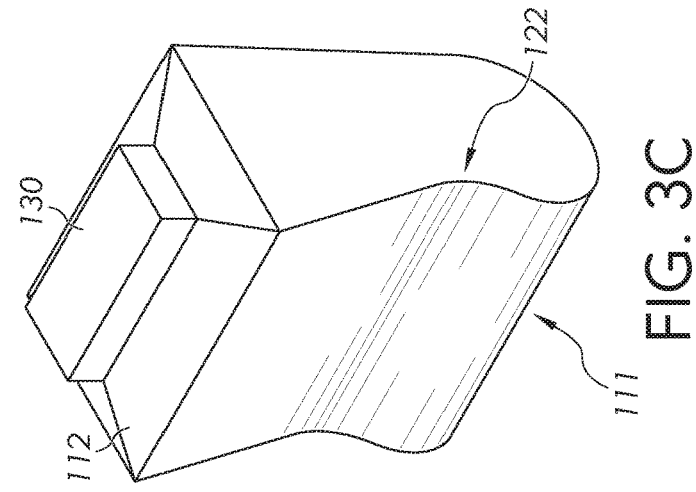
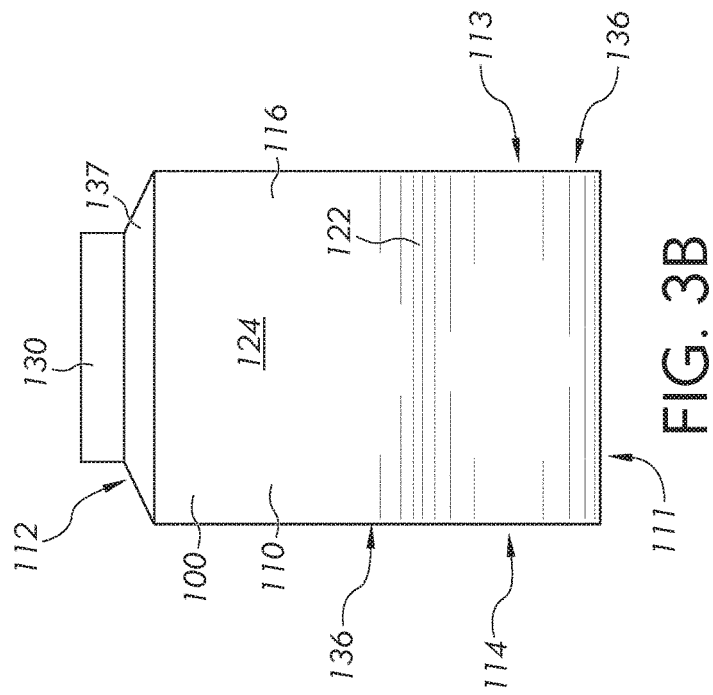
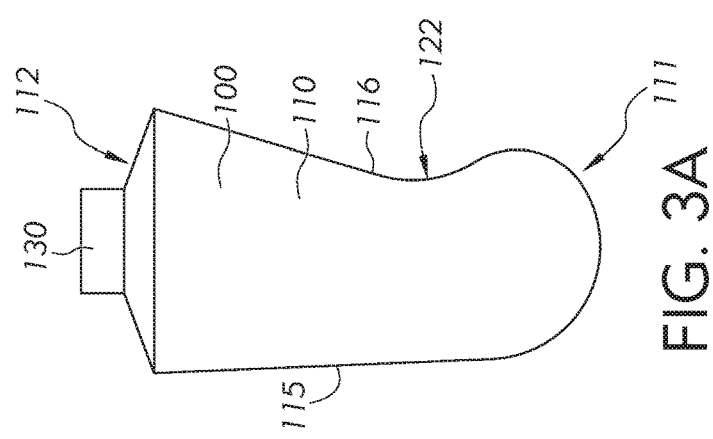

GRAPPLE TIP

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of hand and hoist-line implement art and more specifically relates to grapple replacement tips.

2. Description of Related Art

In logging and other industry vehicles, a grapple is a hydraulically powered claw with two or more opposing levers that pinch a log or other materials, usually to lift or drag them. A grapple can be mounted to a tractor or excavator with a movable arm that may lift, extend, and move side-to-side. Some machines also have a separate control for rotating the grapple. Simpler grapple machines consist of a hydraulically liftable fork, rake, or bucket and a movable, opposing lever that may enclose and grip materials for lifting or dragging. Grapple assemblies used in the logging industry often wear down or may become damaged over time due to harsh conditions or frequency of use. A suitable solution is desired.

U.S. Pat. No. 9,185,855 to Humphrey relates to a tree removal field reclamation attachment. The described tree removal field reclamation attachment includes an attachment with a back support frame adaptable for use with a variety of loaders for use in tree removal and field reclamation. The back support frame has a curved front wall serving as a moldboard and a bottom wall with a cutting edge for grading dirt. A stationary lower jaw generally trapezoidal in plan is attached to the back support frame and is made of a plurality of cross braced blades forming a see-through grid through which dirt may be sifted with spade-tipped teeth at a distal end for digging and replaceable strips of saw teeth on the outer blades for ripping tree roots. A movable upper jaw with obliquely mounted grapple arms is mounted on the back support frame and is independently movable towards and away from the stationary lower jaw for applying three-point pressure to a root ball or tree trunk.

BRIEF SUMMARY OF THE INVENTION

In view of the foregoing disadvantages inherent in the known grapple replacement tip art, the present disclosure provides a novel grapple tip device. The general purpose of the present disclosure, which will be described subsequently in greater detail, is to provide a grapple tip device.

A grapple tip is disclosed herein. The grapple tip includes an outer volume having a working end with a rounded surface. The grapple tip may further include a mounting end, a right side, a left side, a bottom surface, and a top surface. The top surface features a grooved recess that may help the device pick up, hold on to, and transport heavy items such as lumber or construction implements across significant distances. In addition, the grapple tip may also have a raised projection extending from the mounting end to ensure a secure and correct mounting on a damaged grapple assembly claw.

A method of using the grapple tip is also disclosed herein. The method of using the grapple tip includes the steps of clearing the damaged gripping claw on the forestry grapple assembly of all debris and remnants from the prior tip, preparing the damaged surface for the replacement grapple tip, installing the replacement grapple tip, welding the replacement grapple tip to the gripping claw, and using the forestry grapple assembly.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a grapple tip device, constructed and operative according to the teachings of the present disclosure.

FIG. 3A is a detailed view of the grapple tip device of FIG. 1, according to an embodiment of the present disclosure showing a close up of the grapple tip device.

FIG. 3B is another detailed view of the grapple tip device of FIG. 1, according to an embodiment of the present disclosure showing a close up of the grapple tip device.

FIG. 3C is yet another detailed view of the grapple tip device of FIG. 1, according to an embodiment of the present disclosure showing a close up of the grapple tip device.

The various embodiments of the present invention will hereinafter be described in conjunction with the appended drawings, wherein like designations denote like elements.

DETAILED DESCRIPTION

As discussed above, embodiments of the present disclosure relate to a grapple replacement tip and more particularly to a grapple tip device as used to improve the tips of a grapple assembly that may be missing, damaged, or worn.

Generally, weld-on tips for grapple claws are constructed from cast steel or iron and experience a significant amount of wear or even break off from the grapple claw and assembly over time. The grapple tip device may be laser cut preferably from QT100 steel and is heat tempered when cut. Other types of steel may be used. Other ferrous and non-ferrous materials may be used in alternate embodiments. In addition, the grapple tip device features a round tip on the end that is a unique shape making it an overall stronger design. The rounding on the end of the grapple tip device helps to improve handling of materials common in the logging and forestry industry such as logs, branches, earth segments, and other items.

The grapple tip device is easy to mount through a simple welding procedure following the breakage or general wearing of an existing grapple claw tip. The grapple tip device reduces damage to logs or other products when grabbed and handled by the grapple assembly. Additionally, the grapple tip device may help to save time and money on industrial projects as it improves the overall production gained from the grapple assembly and reduces downtime during operations due to forced maintenance or tending to breakage of other tips.

Figure 1:
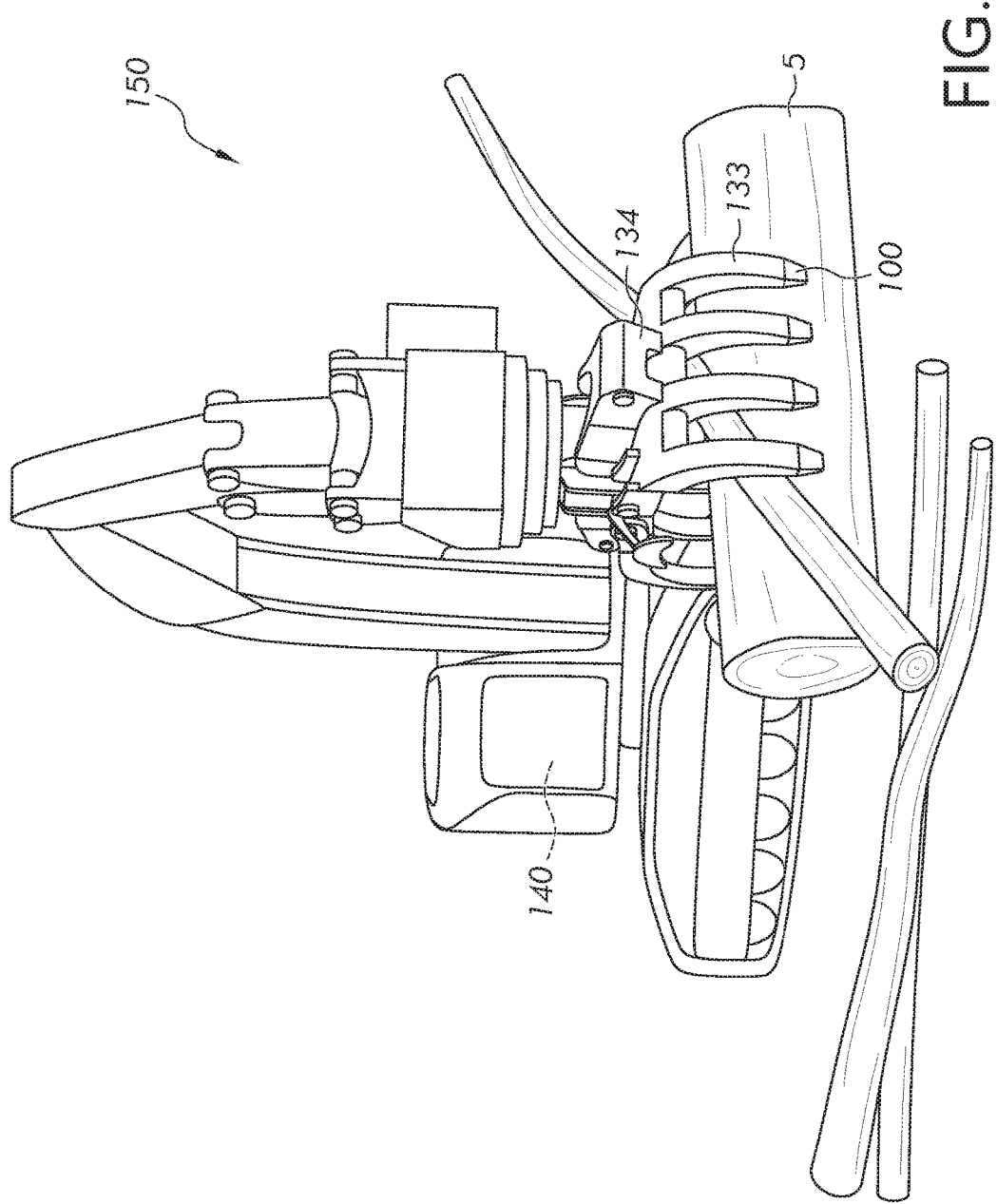
FIG. 1 is a perspective view of a forestry grapple assembly featuring a grapple tip device during an 'in-use' condition, according to an embodiment of the disclosure.

Referring now more specifically to the drawings by numerals of reference, there is shown in FIGS. 1-4, various views of a grapple tip 100. FIG. 1 shows a grapple tip 100 during an 'in-use' condition 150, according to an embodiment of the present disclosure. Here, the grapple tip 100 may be beneficial for use by a user 140 to provide a leveraged grip for retaining movable items 5 with a forestry grapple assembly 134. As illustrated, the grapple tip 100 may be fixed to a gripping claw 133 of a standard forestry grapple assembly 134.

Figure 2:
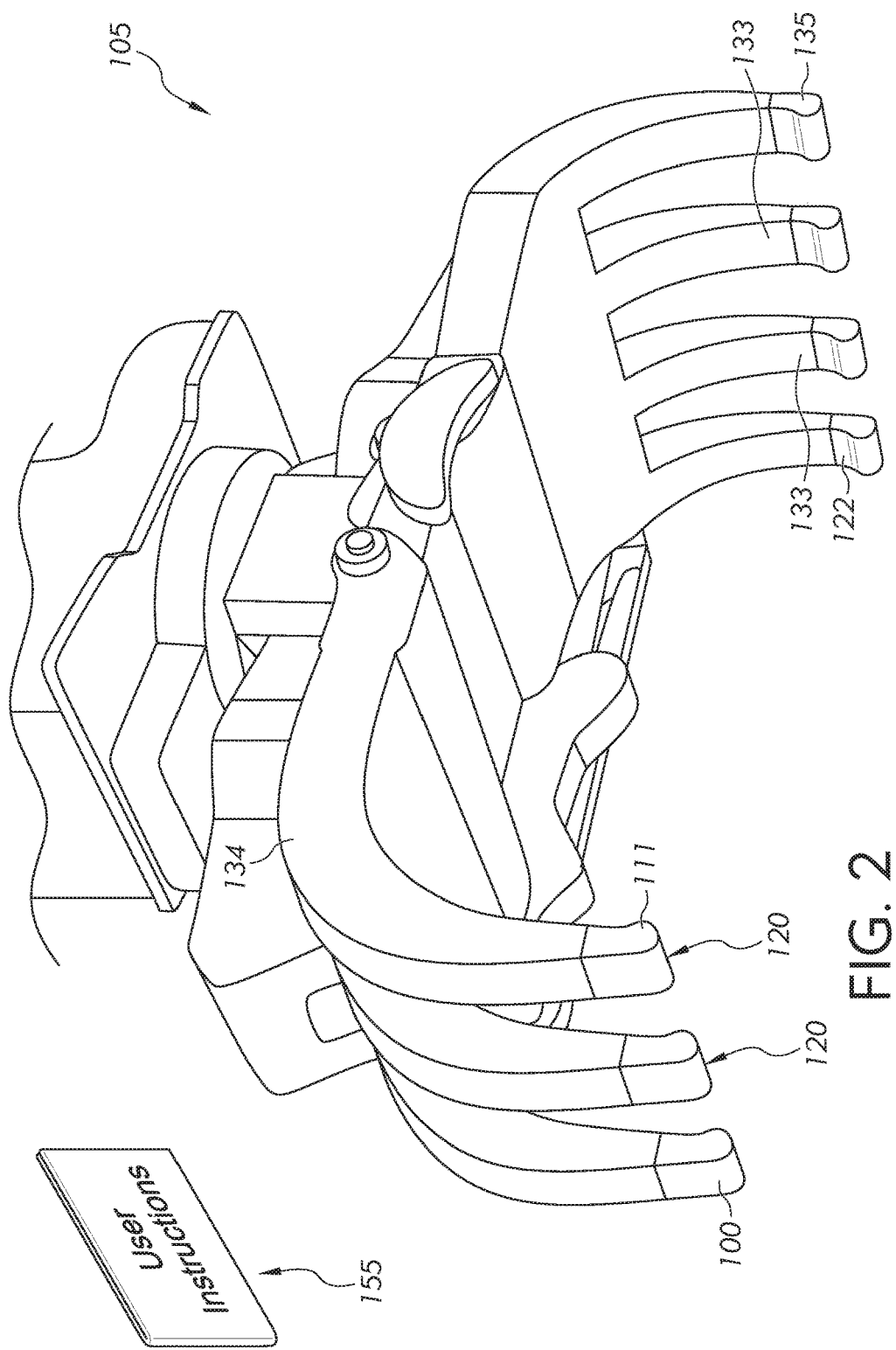
FIG. 2 is a side view of the grapple tip device of FIG. 1, according to an embodiment of the present disclosure. This figure illustrates the grapple tips and their relation in both size and scope to a standard grapple assembly.

FIG. 2 shows the grapple tip 100 of FIG. 1 in a perspective view illustration. According to one embodiment, the grapple tip 100 may be arranged as a kit 105. In particular, the grapple tip 100 may further include a set of instructions 155. The instructions 155 may detail functional relationships in relation to the structure of the grapple tip 100 (such that the grapple tip 100 can be used, maintained, or the like, in a preferred manner. As above, the grapple tip 100 may be constructed from heat tempered steel 135 and may further include a rounded surface 120 on the working end 111 along with a grooved recess 122 to help provide additional grip while moving items with the forestry grapple assembly 134. The grapple tip 100 may be mounted to a brand new gripping claw 133 of the forestry grapple assembly 134 during initial construction or used as a replacement tip after extended wear or breakage has occurred to an existing gripping claw 133 tip.

FIGS. 3A, 3B, and 3C are a collection of perspective views of the grapple tip 100 of FIG. 1, according to an embodiment of the present disclosure. These views illustrate alternative angles of the grapple tip 100 by itself and separate full assembly. FIG. 3A shows the bottom surface 115 and top surface 116 including the grooved recess 122 on the outer volume 110 of the grapple tip 100 nearest to the working end 111. FIG. 3A also clearly illustrates the raised projection 130 extending from the mounting end 112. FIG. 3B shows a front view of the outer volume 110 of the grapple tip 100. FIG. 3B further illustrates the uniformly flat 136 right side 113 and the uniformly flat 136 left side 114 as they both extend perpendicularly between the working end 111 to the mounting end 112 of the grapple tip 100. In addition, FIG. 3B clearly shows the angled perimeter 137 on the mounting end 112 of the grapple tip 100 leading towards the raised projection 130. Similarly, FIG. 3B also shows that the area of the top surface 116 extending from the mounting end 112 to the grooved recess 122 is a continuous plane 124. Finally, FIG. 3C provides another perspective view to the outer volume 110 of the grapple tip 100. This figure demonstrates that the grooved recess 122 on the top surface 116 of the grapple tip 100 is nearer in relation to the working end 111 than the mounting end 112. A third illustration of the raised projection 130 is also shown in FIG. 3C.

Figure 4:
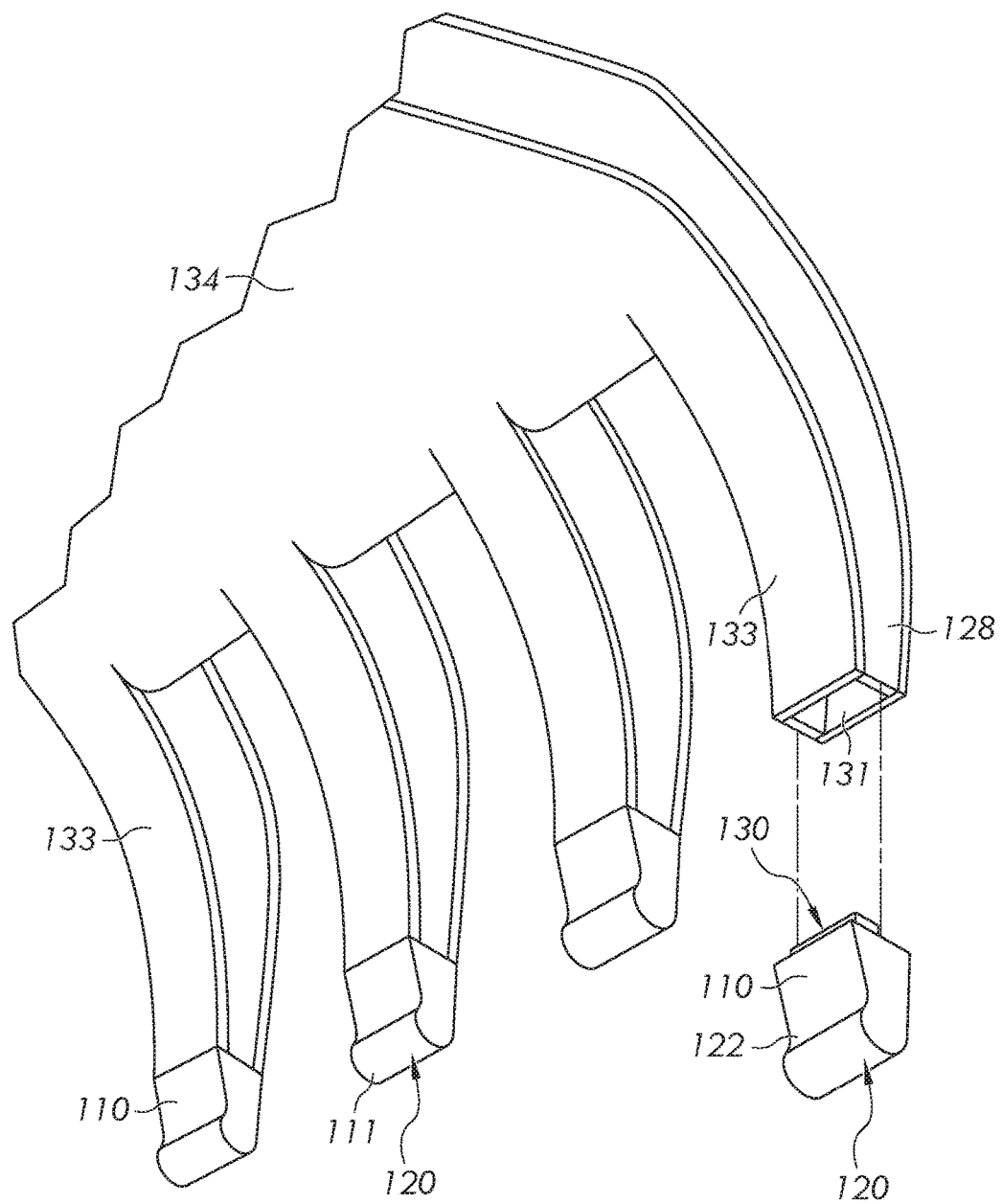
FIG. 4 is an additional perspective view of the grapple tip device of FIG. 1, according to an embodiment of the present disclosure detailing a broken grapple claw and replacement grapple tip. This figure further illustrates the manner in which the replacement grapple tip may be coupled and installed with a bare or damaged grapple claw.

FIG. 4 is a perspective view of the grapple tip 100 of FIG. 1, according to an embodiment of the present disclosure. FIG. 4 shows the rounded surface 120 and grooved recess 122 nearest the working end 111 of the grapple tip 100 as it is mounted on the gripping claw 133 of a standard forestry grapple assembly 134. FIG. 4 additionally illustrates how the outer volume 110 of the grapple tip 100 is dimensionally configured to adjoin the raised projection 130 within a mating socket 131 located at the distal end 128 of a gripping claw 133 on a forestry grapple assembly 134.

Figure 5:
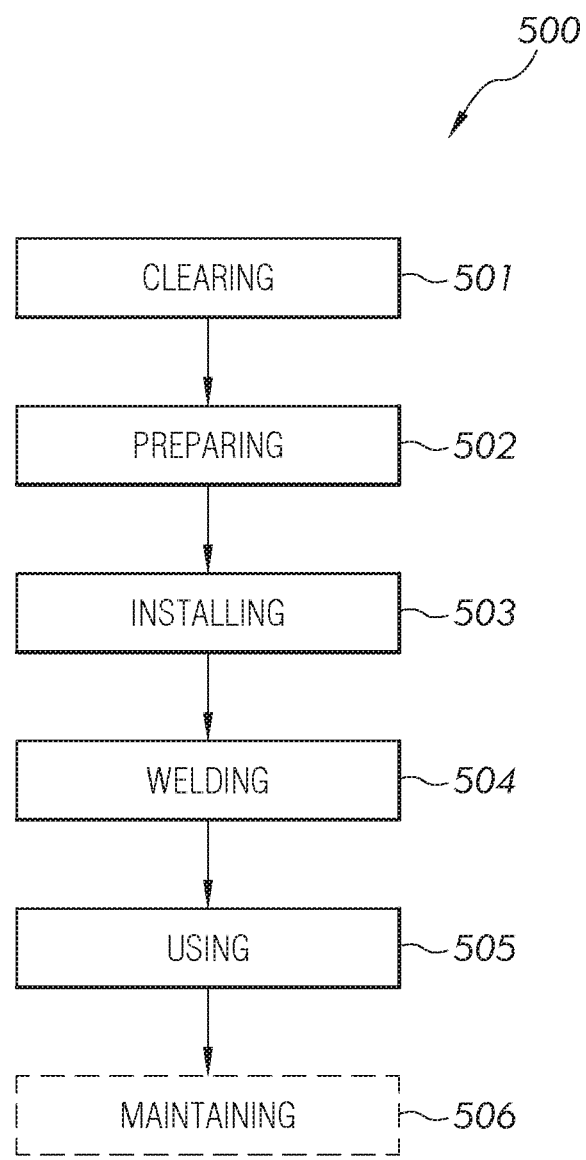
FIG. 5 is a flow diagram illustrating a method of use for a grapple tip device, according to an embodiment of the present disclosure.

FIG. 5 is a flow diagram illustrating a method 500 for the grapple tip 100, according to an embodiment of the present disclosure. In particular, the method for using 500 may include one or more components or features of the grapple tip 100 as described above. As illustrated, the method for using 500 may include the steps of: step one 501, clearing the damaged gripping claw 133 on the forestry grapple assembly 134 of all debris and remnants from the prior tip; step two 502, preparing the damaged surface for the replacement grapple tip 100; step three 503, installing the replacement grapple tip 100; step four 504, welding the replacement grapple tip 100 to the gripping claw 133; step five 505, using the forestry grapple assembly 134.

It should be noted that step six 506, maintaining the grapple tip 100 for prolonged use, is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for grapple tip 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A grapple tip, the grapple tip comprising:
an outer volume having a working end, a mounting end, a right side, a left side, a bottom surface, and a top surface;
a bulbous grip on said working end, said bulbous grip being wider than said working end, said bulbous end being bounded by a curved face which circumscribes said working end by over one-hundred-and-eighty degrees of rotation;
a grooved recess in said top surface, said grooved recess being defined by a transition between said mounting end and said bulbous grip of said working end; and
a raised projection extending from said mounting end.

2. The grapple tip of claim 1, wherein said outer volume is dimensionally configured to adjoin to a gripping claw of a standard forestry grapple assembly.

3. The grapple tip of claim 2, wherein said outer volume is constructed from a heat tempered steel.

4. The grapple tip of claim 3, wherein said outer volume narrows in profile from said mounting end to said working end.

5. The grapple tip of claim 1, wherein said right side is uniformly flat.

6. The grapple tip of claim 5, wherein said right side is perpendicularly oriented between said working end and said mounting end.

7. The grapple tip of claim 1, wherein said left side is uniformly flat.

8. The grapple tip of claim 7, wherein said left side is perpendicularly oriented between said working end and said mounting end.

9. The grapple tip of claim 1, wherein said bottom surface is uniformly flat.

10. The grapple tip of claim 2, wherein said grooved recess in said top surface is structured to provide a leveraged grip for retaining movable items within said forestry grapple assembly.

11. The grapple tip of claim 2, wherein said mounting end features an angled perimeter leading towards said raised projection.

12. The grapple tip of claim 11, wherein said raised projection is dimensionally configured to couple within a mating socket located at the distal end of said gripping claw of said forestry grapple assembly.

13. The grapple tip of claim 1, wherein said grooved recess is nearer in relation to said working end than said mounting end.

14. The grapple tip of claim 13, wherein an area of said top surface extending from said mounting end to said grooved recess is a continuous plane.

15. The grapple tip of claim 14, wherein said continuous plane is free from any weight relief cutouts or secondary indentations.

16. The grapple tip of claim 3, wherein said heat tempered steel is structurally suited for welding to said forestry grapple assembly.

17. A grapple tip, the grapple tip comprising:
an outer volume having a working end, a mounting end, a right side, a left side, a bottom surface, and a top surface;
a bulbous grip on said working end, said bulbous grip being wider than said working end, said bulbous end being bounded by a curved face which circumscribes said working end by over one-hundred-and-eighty degrees of rotation;
a grooved recess in said top surface, said grooved recess being defined by a transition between said mounting end and said bulbous grip of said working end; and
a raised projection extending from said mounting end;
wherein said outer volume is dimensionally configured to adjoin to a gripping claw of a standard forestry grapple assembly;
wherein said outer volume is constructed from a heat tempered steel;
wherein said outer volume narrows in profile from said mounting end to said working end;
wherein said right side is uniformly flat;
wherein said right side is perpendicularly oriented between said working end and said mounting end;
wherein said left side is uniformly flat;
wherein said left side is perpendicularly oriented between said working end and said mounting end;
wherein said bottom surface is uniformly flat;
wherein said grooved recess in said top surface is structured to provide a leveraged grip for retaining items within said forestry grapple assembly;
wherein said mounting end features an angled perimeter leading towards said raised projection;
wherein said raised projection is dimensionally configured to couple within a mating socket located at the distal end of said gripping claw of said forestry grapple assembly;
wherein said grooved recess is nearer in relation to said working end than said mounting end;
wherein an area of said top surface extending from said mounting end to said grooved recess is a continuous plane;
wherein said continuous plane is free from any weight relief cutouts or secondary indentations; and
wherein said heat tempered steel is structurally suited for welding to said forestry grapple assembly.

18. The grapple tip of claim 17, further comprising set of instructions; and
wherein the device is arranged as a kit.

* * * * *